United States Patent [19]
Lee

[11] Patent Number: 5,259,273
[45] Date of Patent: Nov. 9, 1993

[54] TRANSMISSION VACCUM MODULATOR ASSEMBLY

[75] Inventor: Edward Lee, Chesapeake City, Md.

[73] Assignee: Deltrans Inc., Newark, Del.

[21] Appl. No.: 904,859

[22] Filed: Jun. 26, 1992

[51] Int. Cl.[5] ............................................. F16H 59/30
[52] U.S. Cl. ................................................... 74/867
[58] Field of Search ...................................... 74/867

[56] References Cited

U.S. PATENT DOCUMENTS

| | | | |
|---|---|---|---|
| 3,448,767 | 6/1969 | Wonn | 74/867 X |
| 3,587,355 | 6/1971 | Schaefer | 74/868 |
| 3,748,931 | 7/1973 | Schaefer et al. | 74/867 |
| 3,886,819 | 6/1975 | Lentz | 74/867 X |
| 4,711,140 | 12/1987 | Younger | 74/867 X |

OTHER PUBLICATIONS

Ford C-6 Automatic Transmission/Diagnosis—Service Overhaul Manual, ATRA Transmissions (undated).

*Primary Examiner*—Dirk Wright
*Attorney, Agent, or Firm*—Connolly and Hutz

[57] ABSTRACT

A transmission vacuum modulator assembly has a vacuum modulator with a heavy-gauge spring and a diaphragm that are moveably linked to a sliding or spool valve in a bore in a valve assembly. The flow of hydraulic transmission fluid into the transmission, preferably a diesel automatic transmission, is regulated by the sliding valve. The improvement comprises adding a coil spring having a spring force of between about 1 and 2 p.s.i. to the valve assembly in the bore to counteract the spring force on the sliding valve of the heavy-gauge spring in the modulator when the vacuum modulator assembly is in a lower vacuum/higher pressure position. With the added spring, upshifts during acceleration will occur under low vacuum/high pressure conditions without a need to release the throttle. The invention is particularly advantageous for emergency vehicles, such as ambulances, that require rapid, yet smooth, acceleration.

6 Claims, 1 Drawing Sheet

TRANSMISSION VACCUM MODULATOR ASSEMBLY

BACKGROUND OF THE INVENTION

The present invention relates to an automatic transmission vacuum modulator assembly having a vacuum modulator with a spring and a diaphragm moveably linked to a modulator sliding or spool valve, wherein the assembly adjusts the hydraulic pressure within an automatic transmission.

Many vehicles with diesel engines are equipped with a Ford ® C-6 automatic transmission, a fully automatic transmission with three forward speeds and one reverse speed. The transmission consists of a welded torque converter assembly, a two unit planetary gear train, and a hydraulic system to control gear selection and automatic shifts. This Ford ® C-6 transmission is installed in most emergency vehicles, such as ambulances and fire engines, and in many mid-sized trucks.

The transmission is controlled automatically by a hydraulic system in which hydraulic pressure is supplied by an engine-driven transmission oil pump. Main line pressure is controlled by a pressure regulator valve train and by the vacuum modulator. The pressure regulator valve train controls line pressure automatically, in response to a pressure signal from a modulator valve, in such a way that the torque requirements of the transmission clutches are met and proper shift spacing is obtained at most throttle openings.

To control line pressure properly, a modulator pressure is used which varies in the same manner as torque input to the transmission. In a gas engine, the modulator pressure is regulated by engine vacuum which is an indicator of engine torque and carburetor opening. The vacuum modulator is connected at one end to engine vacuum and at the other end to the modulator valve. By contrast, in a diesel engine, vacuum is provided by an auxiliary vacuum pump, and is regulated by means of a vacuum pressure regulator valve located on the injector pump. The vacuum modulator in a diesel engine is thus connected at one end to the vacuum regulator, which is in turn connected to the vacuum pump.

The vacuum modulator mainly comprises a housing, a heavy-gauge spring and a diaphragm. Based upon the vacuum asserted on the modulator, the spring applies a force that acts upon the modulator valve via a connecting pin. When the vacuum is low or zero, the spring force acts on the modulator valve to increase modulator pressure. By contrast, high vacuum pressure acts on the diaphragm to offset spring force and decrease modulator pressure. Thus, low vacuum creates a high pressure condition and high vacuum creates a low pressure condition.

When the modulator vacuum valve is adjusted to provide proper timing and shift feel at closed and part throttle positions, full throttle up-shifts are not normally possible. That is, when there is a low vacuum acting on the vacuum modulator and corresponding high modulator pressure, the valve is in a disadvantageous high pressure or closed position. Thus, the vehicle is in a full throttle ("foot on the floor") position and up-shifts are not possible without decreasing the throttle opening from full throttle ("letting up on the pedal") for a shift to occur. With the Ford ® diesel transmission engines especially, rapid acceleration from a standstill or rapid acceleration up a steep hill, when vacuum is low, is not possible without decreasing the throttle from a full throttle position.

Especially for emergency vehicles with a diesel engine and a Ford ® C-6 automatic transmission, there is a need for a modulator valve that will permit more rapid, yet smooth, gear shifts. Transmission specialists have attempted to solve this problem by reducing the modulator spring pressure acting on the modulator valve when there is a low vacuum/high pressure condition in the valve. The modulator spring force/tension may be adjusted by turning a setting screw. This adjustment does permit upshifts when the valve is in the low vacuum/high pressure position. However, when the modulator spring is adjusted to a position that allows for full throttle upshifts during a high pressure position of the valve, closed and part throttle upshifts are usually too early, too mild, or stacked too close together. Such adjustments to the modulator spring thus adversely affect the modulator at low pressure positions.

Vacuum modulator assemblies of a different design to permit upshifts under special conditions are known. One such example in some General Motors ® transmissions consists of a housing, an evacuated metal bellows, a diaphragm and two springs. When installed, the bellows and its external spring apply a force that acts on the modulator valve to increase modulator pressure. Engine vacuum and the other spring within the bellows act in the opposite direction to decrease modulator pressure. The effective area of the diaphragm is somewhat larger than the effective area of the bellows to use atmospheric pressure to compensate for engine power loss at certain conditions, such as at high altitudes. The addition of the bellows and the second spring within the bellows give the modulator assembly in these engines an operating range that spans a greater range of modulator pressures. However, these altitude compensating vacuum modulator assemblies correct a different problem and still would not permit a workable line pressure to allow shifting to occur when there is a low vacuum acting on the modulator.

SUMMARY OF THE INVENTION

A transmission vacuum modulator assembly having a vacuum modulator attached to a valve assembly is provided. The vacuum modulator assembly regulates the transmission pressure. Within the vacuum modulator are a heavy-gauge spring with a spring force of about 11-17 p.s.i. and a flexible diaphragm. The vacuum modulator also has a hollow stem at one end that is connected to a vacuum pressure regulator, which in turn in diesel engines is connected to a vacuum pump. In gasoline engines, vacuum from the engine intake manifold may be used.

Between one end of the spring and one side of the diaphragm is a washer. The diaphragm, washer and spring are moveably linked by a connector to a pin. The pin is in turn linked to one end of a sliding valve or spool valve in the valve assembly. Hydraulic fluid enters the bore through an entrance port and exits into the transmission via one or more exit ports, depending upon the action of the sliding valve and the pressure in the valve assembly.

A second spring has one end seated in a counterbore in the other end of the sliding valve. The other spring end is in contact with a surface of the bore. The spring preferably is formed with 0.018-inch gauge wire. The spring exerts a spring force of about 1 to 2 p.s.i., preferably 1.5 p.s.i., to oppose movement of the sliding valve toward the bore surface.

When the vacuum modulator assembly is in operation, preferably in a diesel automatic transmission, and, most preferably in a Ford ® C-6 diesel automatic transmission, a vacuum exerted on the vacuum modulator exerts a force on the diaphragm that counteracts the heavy-gauge spring force, partially compressing the spring. With such vacuum, there is a lower transmission pressure and the sliding valve may move toward the vacuum modulator, permitting a workable line pressure and allowing shifting to occur.

When vacuum is reduced, however, the spring force pushes the diaphragm, washer, pin and sliding valve away from the vacuum modulator and toward the surface of the bore of the valve assembly. The second spring, seated in the counterbore of the sliding valve, begins to counteract the force of the heavy-gauge spring when the vehicle is at about a ⅜ throttle position. The force of the second spring helps maintain the sliding valve in a higher vacuum/lower pressure position when the throttle is depressed ⅜ or more, permitting upshifts to occur without the need for the operator to let up on the throttle.

DESCRIPTION OF THE PREFERRED EMBODIMENT

Figure 1:
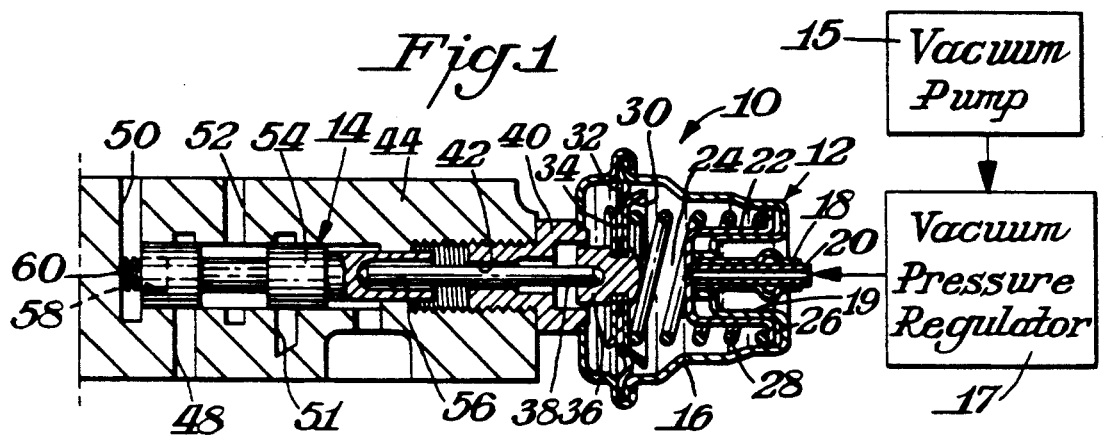
FIG. 1 shows a cross-sectional side elevation view of the vacuum modulator assembly according to the present invention in a low vacuum/high pressure position.
Figure 2:
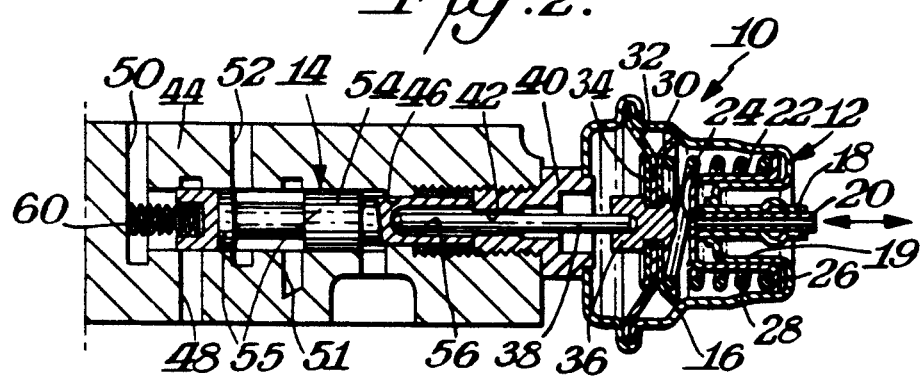
FIG. 2 shows a cross-sectional side elevation view of the vacuum modulator assembly of FIG. 1 in a high vacuum/low pressure position.

Referring to FIG. 1 and FIG. 2, there is shown a vacuum modulator assembly 10 comprised of a vacuum modulator 12 and a valve assembly 14. The vacuum modulator 12 has a housing 16 with an inner cavity and outer surfaces.

In the Ford ® diesel engines with C-6 transmissions, vacuum is provided by a vacuum pump 15 (shown in block form in FIG. 1) and controlled by a vacuum pressure regulator 17 (also shown in block form). The vacuum pressure regulator 17 is attached to a stem 18 at one end of the housing 16. The other end of the housing 16 is attached to the valve assembly 14.

The stem 18 has a threaded hollow core into which a screw 20 is threaded. The screw 20 also has a hollow core, which permits air flow from the vacuum pressure regulator 17 into and out of the stem 18. The base of the stem 18 is fit or attached into an opening in the housing 16 at the base of a recess 19 in the housing 16.

Within the inner cavity of the housing 16, adjacent the inner surface of the recess 19, there is a cup 22. The ends of the stem 18 and screw 20 contact the base of the cup 22. The cup 22 has a hole or opening 24 in its base, with the opening 24 being axially aligned with the hollow core of the screw 20. The upper edge of the cup 22 forms a flange 26.

A heavy-gauge spring 28 with a spring force in the range of about 11–17 p.s.i. is held within the inner cavity of the vacuum modulator 12 and has one end in contact with the flange 26. The other end of the spring 28 contacts a first washer 30 positioned within the inner cavity of the vacuum modulator 12.

Also within the inner cavity of the vacuum modulator 12, adjacent to the first washer 30, is a flexible diaphragm 32. The outer edges of the diaphragm 32 are uniformly held by a crimp in the housing 16. The diaphragm 32 surrounds a connector 36 and is sandwiched between the first washer 30 and a second washer 34. The connector 36 also is in contact with the first and second washers 30, 34.

The connector 36 has a bore at one end into which is fitted one end of a pin 38. The other end of the pin 38 is inserted into a bore 56 in a sliding or spool valve 54. The pin 38 provides the moving link between the diaphragm 32 of the vacuum modulator 12 and a sliding valve or spool valve 54 of the valve assembly 14.

A threaded adaptor 40 connects the stationary housing 16 of the vacuum modulator 12 to the transmission case 44 of the valve assembly 14 by threaded connection with the partially threaded bore 46 in the transmission case 44. In some vacuum modulator assemblies the stationary housing and transmission case may be connected by a retaining bracket (not shown). The adaptor 40 has a tapped and chamfered inner channel 42 that contains the pin 38, permitting the pin 38 to slide back and forth and with some slight flexure within the channel 42. The threaded end of the adaptor 40 provides a fluid tight connection with the partially threaded bore 46 to prevent leakage of hydraulic fluid from the bore 46 or case 44. If a retainer bracket is present, the vacuum modulator may also have an O-ring seal (not shown) to provide a fluid-tight connection.

The transmission case 44 contains a fluid entrance port 48 from the valve body (not shown) and one or more fluid exit ports 50, 52 to the valve body (not shown). A cavity 51 is open to exhaust.

The hydraulic fluid is pumped through the entrance port 48 and into the partially threaded bore 46 of the case 44. The sliding valve 54 has one or more spool portions 55 and slides back and forth within the bore 46. As the sliding valve 54 slides back and forth the spool 55 regulates the fluid flow to the pressure regulator valve (not shown) through one or more of the fluid exit ports 50, 52. The sliding valve 54 has a path of travel only in a range of about 0.175 to 0.200 inches. As permitted by the sliding valve 54, hydraulic fluid exits from the exit ports 52, 52 into the transmission.

Figure 3:
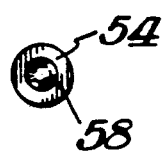
FIG. 3 shows a rear elevational view of a sliding valve of the vacuum modulator assembly according to the present invention.

Now referring to FIG. 3 as well as FIG. 2, the spool 55 at the end of the sliding valve 54 has a counter bore 58, into which is seated one end of a light-gauge spring 60 having a spring force of between 1 to 2 p.s.i., preferably 1.5 p.s.i. Suitable springs may be purchased from Leeco Spring Company of Houston, Tex. The other end of the spring 60 contacts the unthreaded end of the partially threaded bore 46 of the transmission case 44. The spring 60 preferably is a coil spring fashioned from 0.018 inch-gauge piano wire with an uncompressed length of about 0.75 inches.

When the diesel vehicle is operated, modulator pressure is regulated by vacuum from the vacuum pump 15 and vacuum pressure regulator 17. There are two extreme positions for the vacuum modulator valve: zero vacuum/high modulator valve pressure and high vacuum/low modulator valve pressure. The sliding valve 54, pin 38, diaphragm 32, and spring 28 of the modulator valve assembly 10 are constantly moving between these two extreme positions, and all positions therebetween. The typical vacuum range acting on the modulator valve assembly is from about zero to about 14 inches (in Hg). Thus, the high vacuum/low modulator valve pressure position occurs when the vacuum acting on the valve is about 14 inches.

When vacuum is zero, as shown in FIG. 1, the vehicle has a fully open throttle and the vacuum modulator assembly 10 is in a high pressure position. The spring 28 acts on the first washer 30 and the connector 36 with about 11 to 17 p.s.i. to push the pin 38 and the sliding valve 54 toward a lower vacuum and higher pressure position—toward the unthreaded end of the partially threaded bore 46. In the zero vacuum/high pressure position, the spools 55 only partially obstruct the entrance and exit ports 48, 50, and 52 and substantial pressure is modulated by the pressure regulator valve (not shown), hindering the ability to upshift. In the low vacuum/high pressure position, the spring 28 is not very compressed and the flexible diaphragm 32 remains at or near its undeflected position.

Referring now to FIG. 2, when the vacuum pump is asserting a high vacuum on the vacuum modulator 12, the vacuum draws the diaphragm 32 toward the stem 18 of the vacuum modulator 12. The diaphragm 32 pushes the first washer 30 and connector 36 toward the bottom of the cup 22. The spring 24 is thereby compressed between the flange 26 of the cup 22 and the washer 30. With the spring 24 in a partially compressed position, the sliding valve 54 may move to a position toward the threaded end of the partially threaded bore 46 and toward the Vacuum modulator 12. The spools 55 of the sliding valve 54 thus move to a position within the partially threaded bore 46 that permits less boost oil to influence the pressure regulator valve. In this modulator valve assembly position, line pressure is reduced, better allowing for shifting to occur.

With the vacuum modulator assembly 10 according to the invention, the spring 60 opposes the sliding motion of the sliding valve 54 toward the high pressure position until the spring 60 is deflected to a fully compressed position. The spring 60 exerts 1 to 2 p.s.i. of spring force when opposing the movement of the sliding valve 54 toward the unthreaded end of the partially threaded bore 46. When vacuum pressure acting on the vacuum modulator 12 is reduced, the spring 60 partially offsets the force on the sliding valve 54 of the spring 28 in the vacuum modulator 12. The spring 60 pushes the sliding valve 54 away from the zero vacuum/high pressure position of FIG. 1.

In the extreme situation of zero vacuum, the spring 60 will be fully compressed. At this point, as shown in FIG. 1, approximately a 0.040-inch length of the fully compressed spring 60 will protrude from the end of the spool 55 of the sliding valve 54.

At other than when the vacuum approaches zero, the spring 60 has little or no effect on the movement of the sliding valve 54 or the flow of hydraulic fluid into and out of the bore 46. Moreover, the offset spring pressure exerted by the spring 60 diminishes rapidly as the modulator sliding valve 54 strokes toward the low pressure position. Introducing the spring 60 into the valve assembly thereby reduces high pressure at or near full throttle, while having little effect on the low pressure positions.

The invention is not limited to the specific embodiment illustrated and described above. Changes may be made without departing from the spirit of the invention. For example, the invention may be used in transmission vacuum modulator assemblies for gasoline engines, although use in Ford ® C-6 diesel transmission vacuum modulator assemblies is preferred.

I claim:

1. In a transmission vacuum modulator assembly to regulate fluid flow into a transmission, having a vacuum modulator and a valve assembly, and having a spring and a diaphragm in the vacuum modulator that are movably linked to a sliding valve in a bore in the valve assembly, wherein the improvement comprises:
a second spring having two ends, with one second spring end seated in a counterbore in a spool of the sliding valve and with the other second spring end in contact with a surface of the bore so that at low engine vacuum and high throttle the second spring exerts a spring force to oppose movement of the sliding valve toward the bore surface.

2. The transmission vacuum modulator assembly of claim 1, wherein the second spring has a spring force of between about 1 and 2 p.s.i.

3. The transmission vacuum modulator assembly of claim 1, wherein the second spring is a coil spring formed from 0.018 inch-gauge wire and has a spring force of 1.5 p.s.i.

4. The transmission vacuum modulator assembly of claim 1, wherein when the second spring is compressed fully, there is a clearance of about 0.040 inch between the bore surface and the spool of the sliding valve.

5. The transmission vacuum modulator assembly of claim 1, wherein the modulator assembly is installed in a diesel automatic transmission.

6. The transmission vacuum modulator assembly of claim 5, wherein the modulator assembly is installed in a Ford ® C-6 diesel automatic transmission.

* * * * *